United States Patent
Hirose

(10) Patent No.: US 12,050,823 B2
(45) Date of Patent: Jul. 30, 2024

(54) DEVICE MANAGEMENT SYSTEM INCLUDING A SERVER AND A TERMINAL DEVICE, TERMINAL DEVICE FOR THE DEVICE MANAGEMENT SYSTEM, AND NON-TRANSITORY COMPUTER-READABLE RECORDING MEDIUM FOR THE TERMINAL DEVICE

(71) Applicant: Brother Kogyo Kabushiki Kaisha, Nagoya (JP)

(72) Inventor: Kasumi Hirose, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/174,697

(22) Filed: Feb. 27, 2023

(65) Prior Publication Data
US 2023/0305768 A1 Sep. 28, 2023

(30) Foreign Application Priority Data
Mar. 23, 2022 (JP) ................. 2022-046550

(51) Int. Cl.
*G06F 11/16* (2006.01)
*G06F 3/12* (2006.01)
*H04N 1/00* (2006.01)

(52) U.S. Cl.
CPC .......... *G06F 3/1231* (2013.01); *G06F 3/1203* (2013.01); *G06F 3/1273* (2013.01); *H04N 1/00084* (2013.01)

(58) Field of Classification Search
CPC ..... G06F 3/1231; G06F 3/1203; G06F 3/1273
USPC ...................... 358/1.15; 399/10, 8
See application file for complete search history.

(56) References Cited

U.S. PATENT DOCUMENTS

2017/0111247 A1* 4/2017 Uchiyama ............. G06F 3/1229
2021/0314461 A1* 10/2021 Hatada .................. G06F 3/1203

FOREIGN PATENT DOCUMENTS

JP          2021-163309 A      10/2021

* cited by examiner

*Primary Examiner* — Jamares Q Washington
(74) *Attorney, Agent, or Firm* — KENEALY VAIDYA LLP

(57) ABSTRACT

In a device management system, a terminal device receives a replacement instruction from a user when an acceptance condition is satisfied, and obtain first device identification information before the replacement, second device identification information after the replacement, first history information representing usage history of the first device from the first device without going through the server. The terminal device then transmits, to the server, a replacement request containing the first device identification information, the second identification information and the first history information. In a case where an allowance condition is satisfied, the server stores, in the storage of the server, second management information representing a relationship among the first management identification information associated with the first device identification information by the first management information, the first history information and the second device identification information.

12 Claims, 7 Drawing Sheets

| SERVICE IDENTIFIER SA | AUTHENTICATION INFORMATION AI |
|---|---|
| SA1 | AI1 |
| ⋮ | ⋮ |

| SERVICE IDENTIFIER SA | SERIAL NUMBER SN | TOKEN TK | PRINT HISTORY PH |
|---|---|---|---|
| SA1 | SN1 | TK1 | PHa |
| ⋮ | ⋮ | ⋮ | ⋮ |

| MODEL NAME MD | SERIAL NUMBER SN | PRINT HISTORY PH |
|---|---|---|
| MD1 | SN1 | PHa |

| MODEL NAME MD | SERIAL NUMBER SN | PRINT HISTORY PH |
|---|---|---|
| MD1 | SN2 | PHx |

DEVICE MANAGEMENT SYSTEM INCLUDING A SERVER AND A TERMINAL DEVICE, TERMINAL DEVICE FOR THE DEVICE MANAGEMENT SYSTEM, AND NON-TRANSITORY COMPUTER-READABLE RECORDING MEDIUM FOR THE TERMINAL DEVICE

REFERENCE TO RELATED APPLICATIONS

This application claims priority from Japanese Patent Application No. 2022-046550 filed on Mar. 23, 2022. The entire content of the priority application is incorporated herein by reference.

BACKGROUND ART

The present disclosures relate to a technique of managing devices, and more particularly, a device management system, a terminal device therefor, and a non-transitory computer-readable recording medium for such a terminal device.

Various devices such as printers and scanners are used for various services. Generally, devices used for a certain service is managed by a server. For example, there has been known a conventional art for changing a second printer registered with a server to a first printer as described below. In such a conventional art, in response to an operation of a user, the first printer transmits a print change request containing a printer ID to the server. The first printer displays a URL of input screen data to input account information. This URL contains the printer ID of the first printer as a query. A terminal device of the user obtains the URL, and transmits data request containing the URL. The server transmits the input screen data to the terminal device. The terminal device transmits account information input by the user to the server. Then, the server registers the first printer as a printer subject to the service, instead of the second printer which is identified by the printer ID associated with the account information.

DESCRIPTION

In the above-described system, in addition to an identifier (e.g., the printer ID) of a device (e.g., the printer), the server could register various information related to the device (e.g., usage history of the device). When replacing a former device that has already been registered with the server with a new device, information related to the former device can be succeeded to the new device. The succession of information could have various defects. For example, there are cases where the information to be succeeded may not be the latest information.

According to aspects of the present disclosures, there is provide device management system, provided with a server having a storage configured to store management information that includes device identification information for identifying devices, and a terminal device including a controller having hardware and configured to perform receiving a replacement instruction that instructs replacement of the device identification information having been stored in the server when an acceptance condition is satisfied, in response to receipt of the replacement instruction, first obtaining first device identification information that is the identification information before the replacement, second obtaining second device identification information that is the identification information after the replacement, and obtaining first history information representing usage history of the first device from the first device identified by the first device identification information without going through the server. The controller is further configured to perform transmitting, to the server, a replacement request that is a request to replace the first device identification information having been stored in the server with the second device identification information, the replacement request containing the first device identification information, the second identification information and the first history information. The storage of the server stores first management information representing a relationship between the first device identification information and first management identification information, and the server is configured to store, in the storage of the server, second management information in a first case where an allowance condition for allowing replacement of the first device identification information with the second identification information is satisfied, the second management information represents a relationship among the first management identification information associated with the first device identification information by the first management information, the first history information and the second device identification information.

According to aspects of the present disclosures, there is provide a device management system provided with a server having a storage configured to store management information that includes device identification information for identifying devices, and a terminal device having a user interface and a controller configured to perform receiving, through the user interface, a replacement instruction to replace the device identification information having been stored in the server, in response to the replacement instruction, first obtaining first device identification information that is device identification information before replacing the device identification information, second obtaining second device identification information that is device identification information after replacing the device identification information, and obtaining first history information representing usage history of the first device from the first device identified by the first device identification information without going through the server. the controller is further configured to perform transmitting, to the server, a replacement request to replace the first device identification information having been stored in the server with the second device identification information. The replacement request includes the first device identification information, the second device identification information and the first history information. The storage of the server stores first management information indicating a relationship between the first device identification information and first management identification information, and the server is configured to store the first management identification information associated with the first device identification information by the first management information and second management information indicating a relationship between the first history information and the second device identification information in the storage.

According to aspects of the present disclosures, there is provide a non-transitory computer-readable recording medium for a computer configured to communicate with a server having a storage storing management information containing device identification information for identifying devices, the recording medium contains computer-executable instructions which cause, when executed by the computer, the computer to perform receiving, through a user interface, a replacement instruction to replace the device identification information having been stored in the server, in response to the replacement instruction, first obtaining first device identification information that is device identification information before replacing the device identification information, second obtaining second device identification information that is device identification information after replacing the device identification information, and obtaining first history information representing usage history of the first device from the first device identified by the first device identification information without going through the server. The instructions further cause the computer to perform transmitting, to the server, a replacement request to replace the first device identification information having been stored in the server with the second device identification information, the replacement request including the first device identification information, the second device identification information and the first history information. The storage of the server stores first management information indicating a relationship between the first device identification information and first management identification information, and the replacement request is a request requiring the storage to store the first management identification information associated with the first device identification information by the first management information and second management information indicating a relationship between the first history information and the second device identification information in the storage.

FIG. 2A shows an example of an account table.

FIG. 2B shows an example of a registered device table.

FIG. 2C shows an example of device information.

FIG. 2D shows another example of the device information.

A. EMBODIMENT

A1. Configuration of Device

Figure 1:
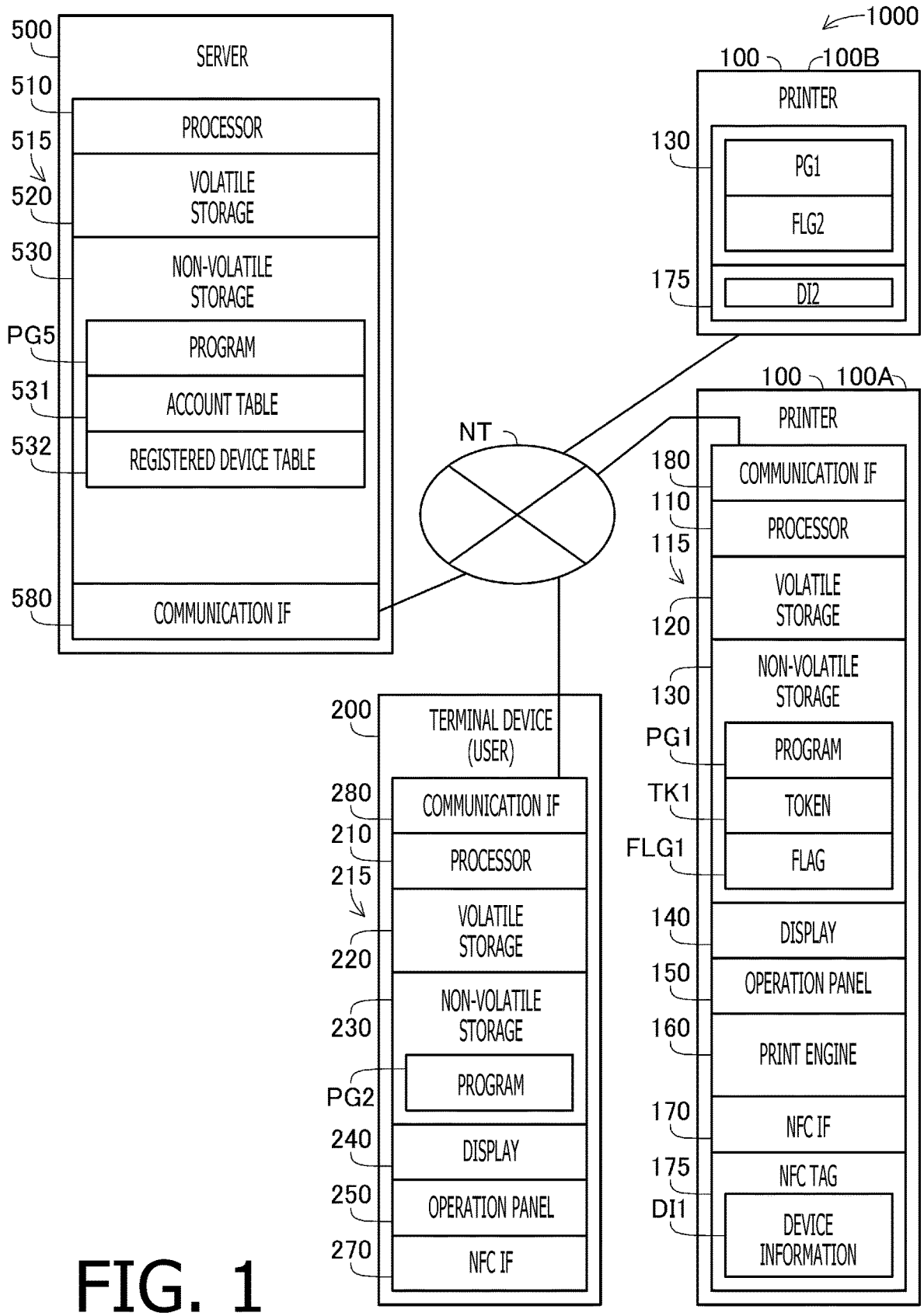
FIG. 1 is a block diagram showing a device management system according to aspects of the present disclosures.

FIG. 1 is a block diagram of a device management system according to aspects of the present disclosures. The device management system 1000 includes a printer 100A, a printer 100B, a terminal device 200 and a server 500. The server 500 is provided by a printing service provider. The printing service provider provides printers 100A and 100B to a user who has contracted for the printing service. The terminal device 200 is a device of the user. The devices (i.e., the printers 100A and 100B, the terminal device 200, and the server 500) are connected to a network NT. The network NT may include the Internet. Further, the network NT may include a so-called local network.

Printing services provided by printing service providers may include a variety of services. For example, this could include a usage-based service that charges a fee based on the number of sheets printed, a fixed-fee service that allows printing up to a predetermined number of sheets within a predetermined period (also called a subscription service), and various other types of services. In the present embodiment, the printer used for the printing service is registered with the server 500. The server 500 is configured to obtain historical information indicating usage history (e.g., the cumulative number of sheets printed, cumulative consumption of consumables, and the like) from registered printers for the provision of printing services. Using the historical information, the server 500 performs various processes for the printing service (e.g., reimbursement of expenses, dispatch of supplies, and the like).

Hereinafter, it is assumed that the printing service provider provides a first printer 100A to a user who has contracted for printing services, and the first printer 100A has already been registered with the server 500.

When the first printer 100A fails (becomes out of order), the printing service provider will provide the user with a second printer 100B. As will be described later, in such a case, the server 500 performs a process to change the first printer 100A having been registered with the server 500 to the second printer 100B.

According to the present embodiment, the first printer 100A and the second printer 100B have the same hardware configurations. In FIG. 1, for brevity, only part of the components of the first printer 100A and part of components of the second printer 100B are indicated. Hereafter, when referring to the printers 100A and 100B without distinction, the alphabetic characters at the end of the reference numbers will be omitted and they will be referred to simply as the printer(s) 100.

The printer 100 includes a processor 110, a storage 115, a display 140, an operation panel 150, a print engine 160, an NFC IF 170 ("NFC" being an abbreviation of "near field communication" and "IF" being an abbreviation of "interface"), and a communication IF 180. These components are interconnected through a bus. The storage 115 includes a volatile storage 120 and a non-volatile storage 130. The printer 100 further includes an NFC tag 175.

The display 140 is a device configured to display images, and is, for example, an LCD (liquid crystal display), an organic EL (electroluminescence) display, an LED (light emitting diodes) display or the like. The operation panel 150 is a device configured to receive user operations, and is provided with buttons, levers, a touch panel overlayed on the display 140 and the like. The communication IF 180 is an interface to communicate with other devices. For example, the communication IF 180 may include at least one of a USB interface, a wired LAN interface, and a wireless interface compliant with the IEEE 802.11 standards. In the present embodiment, the communication IF 180 is connected to the network NT.

The processor 110 is a device configured to perform data processing, and is, for example, a CPU. The volatile storage 120 is, for example, a DRAM. The non-volatile storage 130 is, for example, a flash memory. The non-volatile storage 130 is configured to store data representing a program PG1. The program PG1 has been stored, in advance, in the non-volatile storage 130 by a manufacturer of the printer 100 as firmware. By executing the program PG1, the processor 110 performs various processes described later.

Further, the non-volatile storage 130 of the first printer 100A stores data representing a first token TK1, and data representing a first flag FLG1. The non-volatile storage 130 of the second printer 100B stores data representing the program PG1, and data representing a second flag FLG2. The first token TK1 and the flags FLG1 and FLG2 will be described in detail later.

The NFC IF 170 is an interface known as so-called an NFC forum device. The NFC tag 175 is a non-contact storage device known as so-called an NFC forum tag. As is well known, the NFC tag 175 includes a storage (e.g., a flash memory) and a wireless communication circuit. In the present embodiment, the NFC IF 170 is configured to operate in a reader/writer mode so that the NFC IF 170 performs reading out of data from the NFC tag 175 and writing of data to the NFC tag 175. The NFC tag 175 of the first printer 100A stores first device information DI1, and the NFC tag 175 of the second printer 100B stores second device information DI2 (the device information DI1 and DI2 will be described in detail later). Further, the NFC IF 170 operates in a peer-to-peer mode to communicate with an external device (e.g., the terminal device 200). The NFC IF 170 may operate in the peer-to-peer mode during normal operation, waiting for instructions from external devices. The processor 110 may then switch the operating mode of the NFC IF 170 to the reader/writer mode when accessing the NFC tag 175.

The terminal device 200 is a terminal device of the user, and is a computer (e.g., a personal computer, a smartphone, and the like). The terminal device 200 includes a processor 210, a storage 215, a display 240, an operation panel 250, an NFC IF 270, and a communication IF 280. These components are interconnected through a bus. The storage 215 includes a volatile storage 220 and a non-volatile storage 230.

The display 240 is a device configured to display images, and is, for example, an LCD (liquid crystal display), an organic EL (electroluminescence) display, an LED (light emitting diodes) display or the like. The operation panel 250 is a device configured to receive user operations, and is provided with buttons, levers, a touch panel overlayed on the display 240 and the like. The communication IF 280 is an interface to communicate with other devices. For example, the communication IF 280 may include at least one of a USB interface, a wired LAN interface, and a wireless interface compliant with the IEEE 802.11 standards. In the present embodiment, the communication IF 280 is connected to the network NT.

The processor 210 is a device configured to perform data processing, and is, for example, a CPU. The volatile storage 220 is, for example, a DRAM. The non-volatile storage 230 is, for example, a flash memory. The non-volatile storage 230 is configured to store data representing a program PG2. By executing the program PG2, the processor 210 performs various processes described later.

The NFC IF 270 is an interface known as so-called an NFC forum device. The NFC IF 270 operates in a peer-to-peer mode to perform data communication with the NFC IF 170 of the printer 100. Further, the NFC IF 270 operates in the reader/writer mode to read data from and write data to the NFC tag 175 of the printer 100.

The server 500 includes a processor 510, a storage 515, and a communication IF 580. These components are interconnected through a bus. The storage 515 includes a volatile storage 520 and a non-volatile storage 530.

The communication IF 580 is an interface to communicate with other devices. The communication IF 580 includes at least one of a USB IF, a wired LAN IF, a wireless communication IF compliant to the IEEE 802.11 standard. In the present embodiment, the communication IF 580 is connected to the network NT.

The processor 510 is a device configured to perform data processing, and is, for example, a CPU. The volatile storage 520 is, for example, a DRAM. The non-volatile storage 530 is, for example, a flash memory. The non-volatile storage 530 is configured to store data representing a program PG5. By executing the program PG5, the processor 510 performs various processes described later.

The non-volatile storage 530 of the server 500 further stores data representing an account table 531 and data representing a registered device table 532.

A2. Configuration of Tables

FIG. 2A shows an account table 531. In the present embodiment, the account table 531 indicates a relationship between a service identifier SA and authentication information AI. The service identifier SA is an identifier which is assigned to a contract for a printing service. The service identifier SA is an example of management identification information used to manage printing services. The authentication information AI is information (e.g., a hash value of a password) used in user authentication to proceed for the service associated with the service identifier SA. In the present embodiment, the service identifier SA and the authentication information AI are determined by the printing service provider in response to the user's application for a contract. One or both of the service identifier SA and the authentication information AI may be configurable by the user. In the example shown in FIG. 2A, account table 531 shows a relationship between a first service identifier SA1 and first authentication information AI1. It is assumed that this relationship indicates a service using the first printer 100A.

FIG. 2B shows a registered device table 532. In the present embodiment, the registered device table 532 shows a relationship among the service identifier SA, a serial number SN, the token TK, and a print history PH. The relationship among the service identifier SA, the serial number SN, the token TK, and the print history PH is an example of information used for the management of the printing service. The service identifier SA is the same as the service identifier in the account table shown in FIG. 2A. The serial number SN is a serial number of the printer 100 (i.e., an identifier of the printer 100). The token TK is information used to proceed the communication between the printer 100 and the server 500. The print history PH is history of the printing by the printer 100. In the present embodiment, the print history PH indicates the cumulative number of printed sheets. As will be described later, the print history PH is notified to the server 500 by the printer 100. In the example shown in FIG. 2B, the registered device table 532 shows a relationship among a first service identifier SA1, a first serial number SN1, the first token TK1 and print history PHa. This relationship is information to be associated with the first printer 100A. That is, the first serial number SN1 is a serial number of the first printer 100A. further, the print history PHa is the print history of the first printer 100A.

Although not shown, according to the present embodiment, the printer 100 and the server 500 perform an initial process to start using the printing service when starting to use the printer 100. By the initial process, the relationship among the service identifier SA, the serial number SN and the token TK is registered in the registered device table 532. The initial process may be of any type of process. For example, the user inputs the first service identifier SA1 notified by the printing service provider into the first printer 100A. Then, the processor 110 of the first printer 100A transmits the data presenting the first service identifier as input and the data representing the first serial number SN1 to the server 500. The processor 510 of the server 500 then generates the first token TK1, and registers the relationship among the first service identifier SA1, the first serial number SN1 and the first token TK1 in the registered device table 532. The processor 510 transmits data representing the generated first token TK1 to the first printer 100A. The processor 110 of the first printer 100A stores the data representing the first token TK1 in the non-volatile storage 130. It is noted that, in the initial process, the second terminal device 200 may also be used. For example, the user may input the first service identifier SA1 in the second terminal device 200. Then, the processor 210 of the terminal device 200 may communicate with the first printer 100A and notify the first printer 100A of the first service identifier SA1. Further, the printing service provider may perform the initial process using the first printer 100A and the server 500 before shipping the first printer 100A to the user.

FIG. 2C shows first device information Dn. In the present embodiment, the first device information DI1 shows a relationship among a model name MD, the serial number SN and the print history PH of the first printer 100A. In the example shown in FIG. 2C, the first device information DI1 shows the relationship among the first model name MD1, the first serial number SN1 and the print history PHa.

FIG. 2D shows second device information DI2. In the present embodiment, the second device information DI2 shows a relationship among a model name MD, the serial number SN and the print history PH of the second printer 100B. In the example shown in FIG. 2D, the second device information DI2 shows the relationship among the first model name MD1, the second serial number SN2 and print history PHx. It is noted that the model name MD of the second printer 100B may be different from the first model name MD1 of the first printer 100A.

A3. Printing Process

Figure 3:
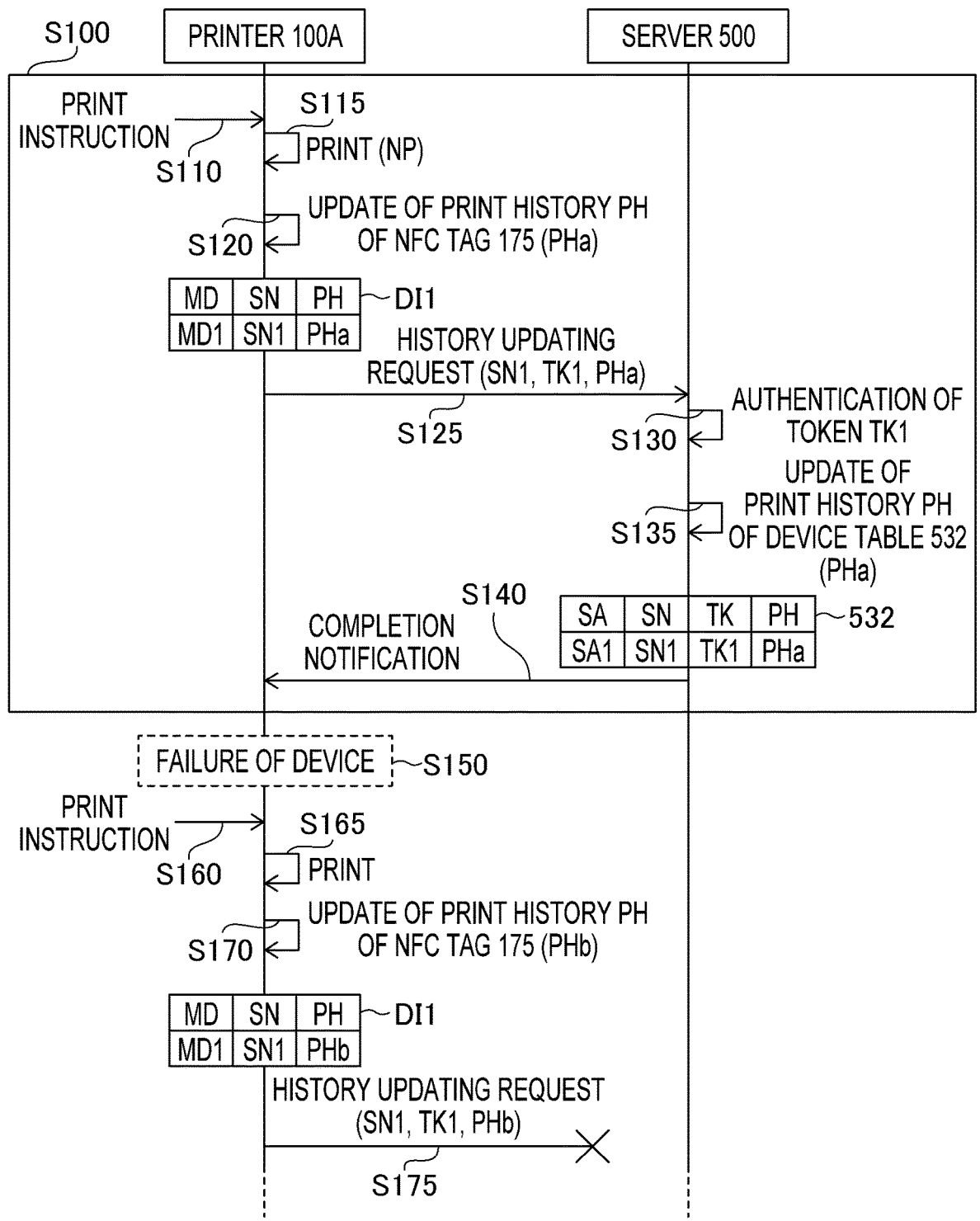
FIG. 3 is a sequence chart showing an example of a printing process.

FIG. 3 is a sequence chart illustrating an example of the printing process. In particular, FIG. 3 shows a case where the first printer 100A performs the printing. After printing, the first printer 100A updates the print history PH in the first device information DI1 (FIG. 2C) and then requests the server 500 to update the print history PH in the registered device table 532 (FIG. 2B). In the following description, the first printer 100A will also be referred to as the printer 100A.

In S110, the printer 100A receives a print instruction from an external device. The print instruction may contain image data representing an image to be printed. A transmitting device that transmits the print instruction may be any device that can communicate with the printer 100A. For example, the printer 100A may receive the print instruction from the external device (e.g., the terminal device 200) through the NFC IF 170. Alternatively, when the communication IF 180 (see FIG. 1) of the printer 100A has a USB IF, the transmitting device of the print instruction may be an external device (e.g., a personal computer) that is wired to the USB IF. Further alternatively, the printer 100A may receive the print instruction from a server other than the server 500.

In S115, the processor 110 of the printer 100A prints the image in accordance with the print instruction. In the following description, it is assumed that the image data represents NP images (NP being an integer equal to or greater than one) to be printed on NP sheets. The number NP will be referred to as the number of printed sheets NP.

In S120, the processor 110 updates the print history PH of the first device information DI1 (see FIG. 2C) of the NFC tag 175 in accordance with the printing performed in S115. In FIG. 3, the updated first device information DI1 is indicated. In the present embodiment, the processor 110 retrieves the print history PH from the NFC tag 175 through the NFC IF 170. The processor 110 adds the number of printed sheets NP printed in S115 to the cumulative number of printed sheets indicated by the retrieved print history PH. The processor 110 writes the cumulative number of prints updated by this addition to the NFC tag 175 through the NFC IF 170. In this way, the print history PH of the first device information DI1 is updated. Hereafter, it is assumed that print history PHa indicates the cumulative number of printed sheets updated in S120.

In S125, the processor 110 transmits a history updating request to the server 500. This request contains data representing the serial number SN, the token TK and the print history PH (in this case, the first serial number SN1, the first token TK1 and the print history PHa). The first serial number SN1 and the print history PHa are obtained from the first device information DI1 (see FIG. 2C) of the NFC tag 175. The first token TK1 is obtained from the non-volatile storage 130 (see FIG. 1).

In S130, the processor 510 of the server 500 authenticates the token TK transmitted from the processor 110 in S125. In the present embodiment, when a combination of the token TK and the serial number SN transmitted from the processor 110 (in this case, a combination of the serial number SN1 and the token TK1) has been registered in the registered device table 532 (see FIG. 2B), the processor 510 determines that the authentication of the token TK is successful. When the combination of the token TK and the serial number SN is not registered in the registered device table 532, the processor 510 determines that the authentication is unsuccessful. In this case (i.e., when the authentication is unsuccessful), the processor 510 aborts the update (e.g., the processor 510 notifies the printer 100A of the abort of the update).

When the authentication of the token TK is successful, the processor 510 updates the registered device table 532 in S135. In FIG. 3, the updated registered device table 532 is indicated. The processor 510 updates the print history (print history) PH associated with the authenticated information SN1 and TK1 to the print history PHa which is received in S125. The processor 510 stores data representing the updated registered device table 532 in the non-volatile storage 530.

In S140, the processor 510 transmits a notification of the completion of the update to the printer 100A. Then, the printing process is terminated. In the following description, Hereinafter, the entire process of S110-S140 is referred to as a print-process S100. Each time printer 100A receives a print instruction, the printer 100A and the server 500 perform the print-process S100.

A lower part of FIG. 3 shows an example of a process in which the printer 100A fails after the print-process S100. For the sake of description, it is assumed that the communication IF 180 of the printer 100A fails (S150).

Processes of S160, S165 and S170 are the same as the processes of S110, S115 and S120, respectively. It is, however, noted that the image data for printing in S160 could be different from the image data for printing in S110. It is assumed that, by the update performed in S170, the print history PH of the first device information DI1 has been updated from the print history PHa to print history PHb. In FIG. 3, the updated first device information DI1 is indicated. Hereafter, the print history PHa is also referred to as unupdated print history PHa, and the print history PHb is also referred to as updated print history PHb.

In S175, the processor 110 of the printer 100A attempts to transmit a history updating request including data indicating the information SN1, TK1, and PHb to the server 500. However, due to a failure of the communication IF 180 of the printer 100A, this request does not reach the server 500. As a result, the print history (print history) PH in the registered device table 532 of the server 500 remains as the unupdated print history PHa.

When the printer 100A fails, the user informs the print service provider that the printer fails. Then, the print service provider will send a substitute printer to the user. Hereafter, it is assumed that the second printer 100B (FIG. 1) is the substitute printer. The user performs a replacing process to replace the registered printer on the server 500 from the first printer 100A to the second printer 100B.

A4. Replacing Process

Figure 4:
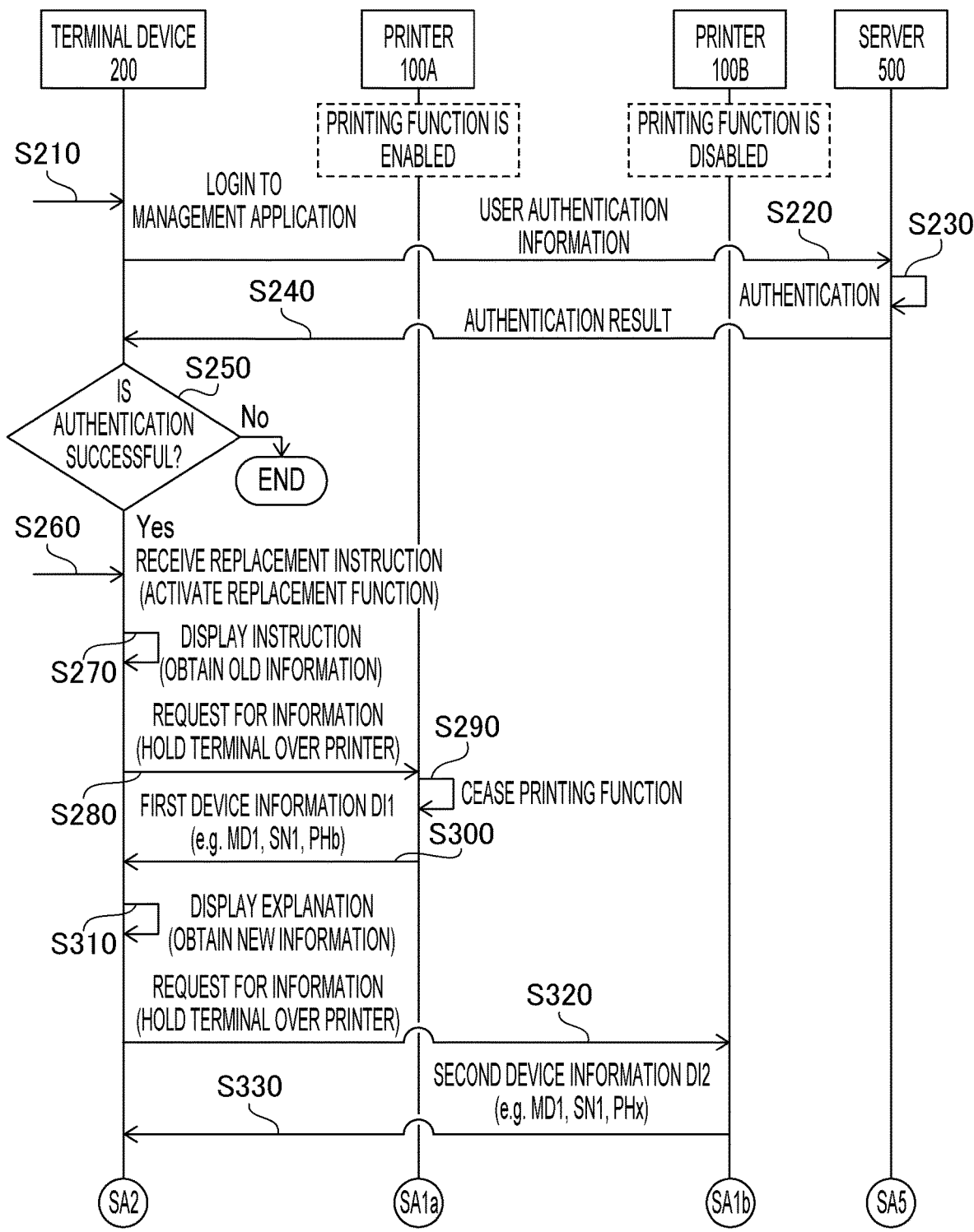
FIGS. 4-6 show a sequence chart showing an example of a replacing process.
Figure 5:
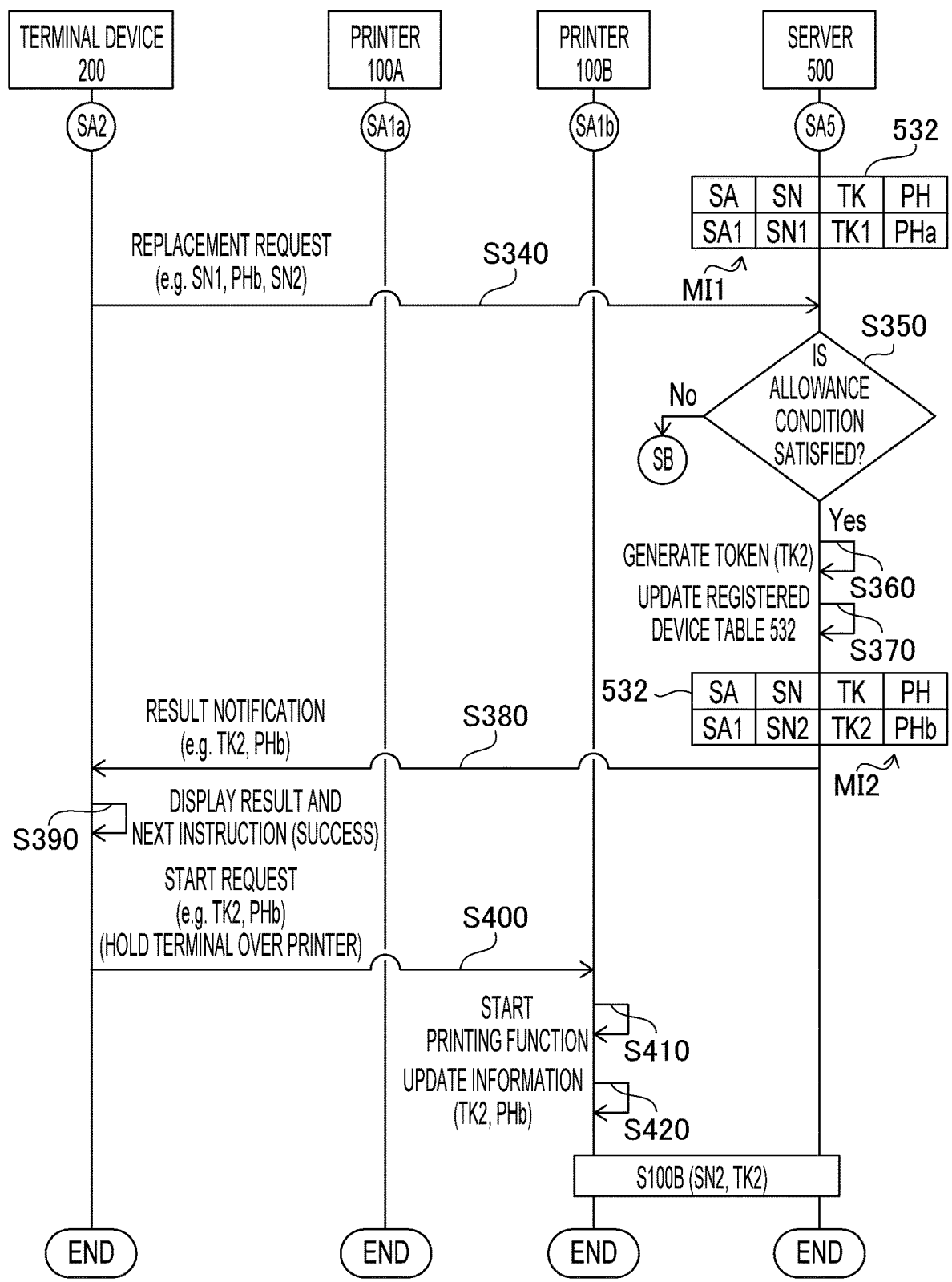
Figure 6:
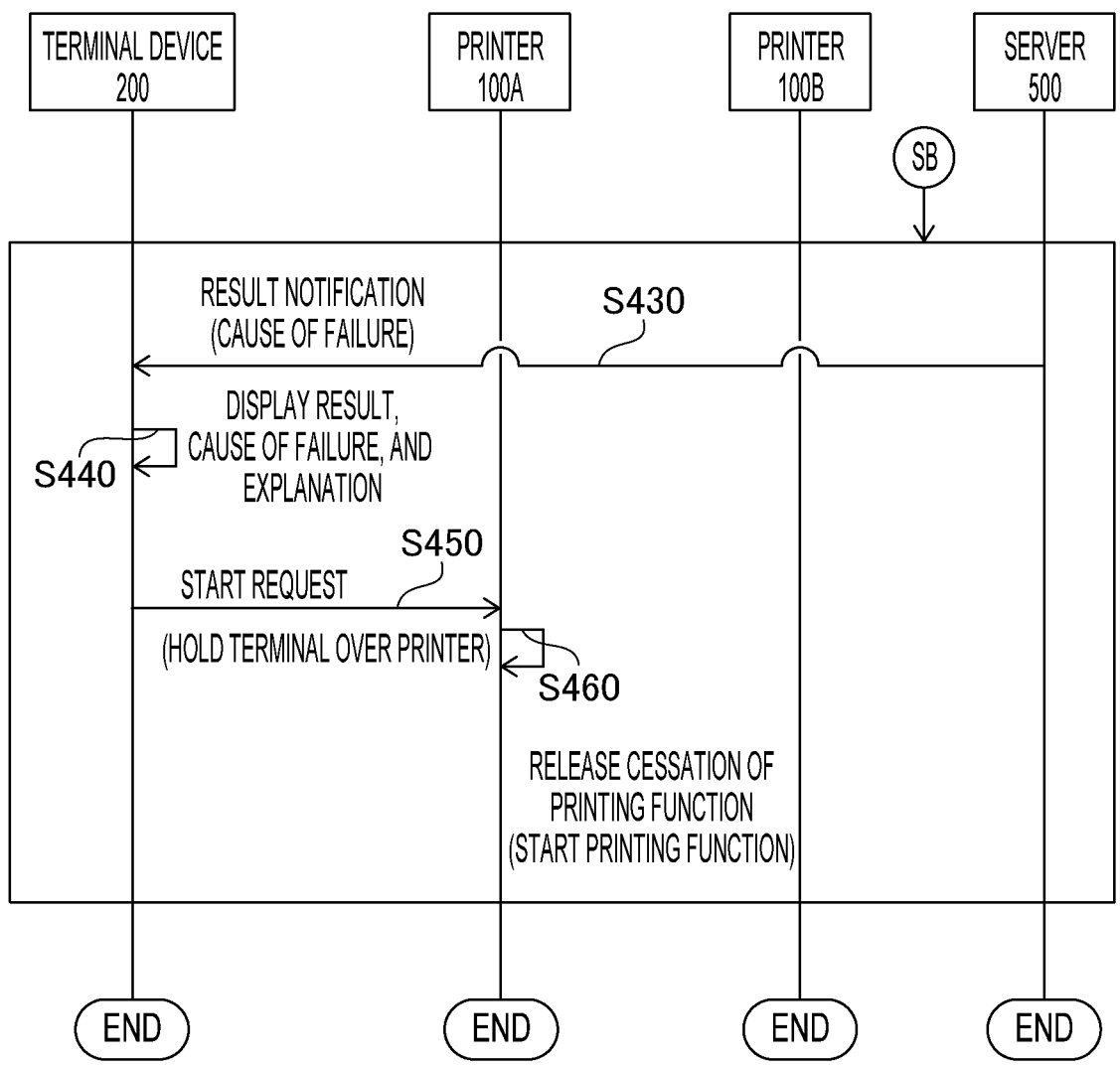

FIGS. 4-6 show a sequence chart illustrating an example of the replacing process. The replacing process proceeds in the order of FIGS. 4-6. It is noted that FIG. 4-FIG. 6 show the replacing process performed in response to the failure of the first printer 100A described with reference to the lower part of FIG. 3.

In the present embodiment, the flags FLG1 and FLG2 stored in the non-volatile storage device 130 (FIG. 1) indicate whether the printing function is enabled or not. When the flag indicates "enabled," the processor 110 allows printing, while when the flag indicates "disabled," the processor 110 prohibits printing.

When the printer 100 is manufactured, the flag is set to "disabled." Thereafter, when the printer 100 is registered with the server 500, the flag is set to "enabled." The change of flags may be performed by the processor 110 and/or by an external device. When the replacing process (FIG. 4-FIG. 6) begins, the first printer 100A is registered with the server 500, and the second printer 100B is not registered with the server 500. Therefore, the first flag FLG1 of the first printer 100A indicates "enabled" and the second flag FLG2 of the second printer 100B indicates "disabled." That is, at this stage, the printing function of the first printer 100A is enabled and the printing function of the second printer 100B is disabled.

In S210, the user operates the operation panel 250 of the terminal device 200 (FIG. 1) to invoke a management application. The program PG2 of terminal device 200 is a program of the management application. The processor 210 of the terminal device 200 performs functions of the management application according to the program PG2.

In S210, the user inputs instructions to log in to the server 500 by operating the operation panel 250. In S220, the processor 210 transmits user authentication information to the server 500 according to the instructions. The user authentication information may be any information for authentication based on the authentication information AI in FIG. 2A. In the present embodiment, the user authentication information is a combination of the service identifier SA and a password. The user authentication information is notified to the user in advance by the printing service provider. In the present embodiment, the user is notified of the first service identifier SA1 and a password corresponding to the first authentication information AI1. In S210, the user inputs the user authentication information along with the login instructions. The processor 210 transmits data representing the input user authentication information to the server 500. It is noted that the processor 210 may store the data representing the input user authentication information in the non-volatile storage 230. In such a case, at the next login, the processor 210 may retrieve the user authentication information from the non-volatile storage 230.

In S230, the processor 510 of the server 500 performs user authentication by referring to the account table 531 (FIG. 2A) using the user authentication information obtained in S220. In S240, the processor 510 transmits result data indicating the result of the authentication to the terminal device 200.

In S250, the processor 210 of the terminal device 200 refers to the result data to determine whether the authentication was successful or not. When the authentication was unsuccessful (S250: NO), the processor 210 displays information (e.g., a message) indicating that the authentication was unsuccessful on the display 240 and terminates the management application.

When the authentication was successful (S250: YES), the processor 210 displays an operation menu on the display 240 in S260, and receives the user input of further instructions. Although not shown in the drawings, the operation menu indicates one or more selectable instructions, including "Printer Replacement." It is assumed here that the user selects "Printer Replacement." Then, in accordance with the selected instructions, the processor 210 activates the replacement function.

In S270, the processor 210 displays instructions on the display 240 to obtain device information for the former printer (in this case, the first printer 100A). In the present embodiment, this instruction explains that the user should hold the terminal device 200 over a specific part of the former printer (e.g., the part near the NFC tag 175).

In S280, the user holds the terminal device 200 over the first printer 100A according to the instructions. The processor 210 transmits an information request to the first printer 100A through the NFC IF 270. In the present embodiment, the processor 210 sets the operating mode of the NFC IF 270 to the peer-to-peer mode. The processor 210 then transmits the information request to the first printer 100A through the NFC IFs 170 and 270 operating in the peer-to-peer mode.

In S290, the processor 110 of the first printer 100A ceases the printing function n response to the information request. In the present embodiment, the processor 110 sets the first flag FLG1 to "disabled." Thereafter, the processor 110 holds off the printing function until the first flag FLG1 is set to "enabled."

In S300, the processor 110 of the first printer 100A sets the operation mode of the NFC IF 170 to the reader/writer mode. The processor 110 obtains the first device information DI1 from the NFC tag 175 through the NFC IF 170. Then, the processor 110 sets the operation mode of the NFC IF 170 to the peer-to-peer mode. Then, through the NFC IFs 170 and 270 operating in the peer-to-peer mode, the processor 110 transmits the first device information DI1 to the terminal device 200. The first device information DI1 as transmitted represents the first model name MD1, the first serial number SN1 and updated print history PHb.

In S280, the processor 210 of the terminal device 200 may set the operating mode of the NFC IF 270 to the reader/writer mode and transmit the information request directly to the NFC tag 175 of the first printer 100A through the NFC IF 270. Then, in S300, the processor 210 may directly obtain the first device information DI1 from the NFC tag 175. In such a case, in order to disable the printing function of the first printer 100A, it is preferable that the processor 210 of the terminal device 200 transmits a request for disabling the printing function to the first printer 100A through the NFC IFs 170 and 270, which operate in the peer-to-peer mode.

In S310, the processor 210 displays instructions on the display 240 to obtain the device information of the new printer (in this case, the second printer 100B). In the present embodiment, this instruction explains that the user should hold the terminal device 200 over a specific part of the new printer (e.g., a part near the NFC tag 175).

In S320, the user holds the terminal device 200 over the second printer 100B according to the instructions. The processor 210 transmits an information request to the second printer 100B through the NFC IF 270. In the present embodiment, the processor 210 sets the operating mode of the NFC IF 270 to the peer-to-peer mode. The processor 210 then transmits the information request to the second printer 100B through the NFC IFs 170 and 270 operating in the peer-to-peer mode.

In S330, the processor 110 of the second printer 100B sets the operation mode of the NFC IF 170 to the reader/writer mode. The processor 110 obtains the second device information DI2 from the NFC tag 175 through the NFC IF 170. Then, the processor 110 sets the operation mode of the NFC IF 170 to the peer-to-peer mode. Then, through the NFC IFs 170 and 270 operating in the peer-to-peer mode, the processor 110 transmits the second device information DI2 to the terminal device 200. The second device information DI2 as transmitted represents the first model name MD1, the second serial number SN2 and the print history PHx.

In S320, the processor 210 of the terminal device 200 may set the operating mode of the NFC IF 270 to the reader/writer mode and transmit the information request directly to the NFC tag 175 of the second printer 100B through the NFC IF 270. Then, in S330, the processor 210 may directly obtain the second device information DI2 from the NFC tag 175.

After execution of S330, the process proceeds to FIG. 5. In the upper part of FIG. 5, the registered device table 532 at the stage where the process has moved to FIG. 5 is shown. The registered device table 532 stores first management information MI1. The first management information MI1 shows the relationship among the information SA1, SN1, TK1, and PHa of the former printer (in this case, the first printer 100A). As described with reference to the lower part of FIG. 3, the server 500 is unable to receive a history updating request indicating the print history PHb. Therefore, the print history PH of the first management information MI1 remains as the unupdated print history PHa.

In S340, the processor 210 of the terminal device 200 transmits a replacement request to the server 500. The replacement request contains data representing the first serial number SN1 of the former printer, the updated print history PHb of the former printer, and the second serial number SN2 of the new printer.

In S350, the processor 510 of the server 500 determines whether an allowance condition is met to allow the replacement of the former printer with the new printer. The allowance condition may be any condition that indicates that the printer can be replaced appropriately. In the present embodiment, the allowance condition is that the serial number SN of the former printer has already been registered in the registered device table 532.

By adopting the allowance condition in the present embodiment, an erroneous replacement request, as follows, can be detected. There could be a case where the user mistakenly holds the terminal device 200 over the new printer in S280 of FIG. 4, and the user mistakenly holds the terminal device 200 over the former printer in S320. In such a case, the serial number SN of the former printer indicated by the replacement request in S340 is the second serial number SN2. As shown in FIG. 5, the second serial number SN2 is not registered in the registered device table 532. Therefore, the allowance condition is not satisfied.

On the other hand, if the user holds the terminal device 200 over the appropriate printer in each of S280 and S320 (FIG. 4), the serial number SN of the old printer indicated by the replacement request (replacement request) is the first serial number SN1. As shown in FIG. 5, the first serial number SN1 has already been registered in the registered device table 532. Therefore, the allowance condition is satisfied.

When the allowance condition is satisfied (S350: YES), the processor 510 of the server 500 generates a token TK for the new printer in S360. Hereafter, the generated token TK is the second token TK2. In the present embodiment, the processor 510 generates a different token TK for each printer. For example, the processor 510 may use random numbers to generate the token TK. Alternatively, the processor 510 may select an unused token TK from a list of tokens TK determined in advance. Thus, the processor 510 may determine the second token TK2 by any of various processes, such as generation, selection, and the like.

In S370, the processor 510 updates the registered device table 532. In FIG. 5, the updated registered device table 532 is shown. In S370, the processor 510 updates the information SN, TK and PH which are associated with the first serial number SN1 of the former printer obtained in S340. Concretely, the serial number SN is undated to the second serial number SN2 of the new printer obtained in S340. The token TK is updated to the second token TK2 generated in S360. The print history PH is updated to the updated print history PHb of the former printer, which is obtained in S340. Hereafter, the relationship among the updated information SA1, SN2, TK2, and PHb is referred to as second management information MI2.

In S380, the processor 510 transmits a result notification indicating the result of the update (in this case, success) to the terminal device 200. The result notification in S380 indicates that the update has been completed. Further, this result notification contains data indicating the updated second token TK2 updated by the process of S370 and the updated print history PHb.

In S390, the processor 210 of the terminal device 200 displays the result of the update and the next instruction on the display 240 in response to the result notification. In the present embodiment, this instruction explains that the user should hold the terminal device 200 over a specific part of the new printer (e.g., the part near the NFC tag 175).

In S400, the user holds the terminal device 200 over the second printer 100B according to the instructions. The processor 210 transmits a start request to the second printer 100B through the NFC IF 270 to start the printing function. In the present embodiment, the processor 210 sets the operation mode of the NFC IF 270 to the peer-to-peer mode. The processor 210 then transmits the start request to the second printer 100B through the NFC IFs 170 and 270 operating in peer-to-peer mode. The start request contains data representing the second token TK2 and the updated print history (print history) PHb, which is obtained in S380.

In S410, the processor 110 of the second printer 100B starts the printing function in response to the start request. In the present embodiment, the processor 110 sets the second flag FLG2 (FIG. 1) to "enabled."

In S420, the processor 110 updates the information TK and PH. Concretely, the processor 110 stores the second token TK2 obtained in S400 in the non-volatile storage 130. Further, the processor 110 sets the operation mode of the NFC IF 170 to the reader/writer mode. The processor 110 stores the updated print history (print history) PHb in the NFC tag 175 through the NFC IF 170. In this way, the print history PH in the second device information DI2 (FIG. 2D) is updated to the updated print history PHb. Then, the replacement process is terminated.

Thereafter, when the second printer 100B receives a print instruction, the second printer 100B and the server 500 perform a print-process S100B. The procedure of the print-process S100B is the same as the procedure of the print-process S100 in FIG. 3, except that the second printer 100B is used instead of the first printer 100A and that the information SN2 and TK2 of the second printer 100B is used instead of the information SN1 and TK1 of the first printer 100A.

When the allowance condition is not satisfied (S350: NO), the processor 510 skips the updating of the registered device table 532 (S370). The processor 510 then transmits a result notification indicating the result of the update (in this case, unsuccessful) to the terminal device 200 in S430 of FIG. 6. This result notification contains cause information indicating the cause of the failure. In the present embodiment, the cause information indicates that the former printer is not registered with the server 500.

In S440, the processor 210 of the terminal device 200 displays the result of the update and a next instruction on the display 240 in response to the result notification. In the present embodiment, this instruction explains that the user needs to hold the terminal device 200 over a particular part of the former printer (e.g., a part in the vicinity of the NFC tag 175).

In S450, the user holds the terminal device 200 over the first printer 100A in accordance with the explanation (i.e., the instruction). The processor 210 sets the operation mode of the NFC IF 270 to the peer-to-peer mode. Then, the processor 210 transmits the start request to the first printer 100A through the NFC IFs 170 and 270, which operate in peer-to-peer mode.

In S460, the processor 110 of the first printer 100A releases the cessation of the printing function in response to the start request. In the present embodiment, the processor 110 sets the first flag FLG1 to "enabled." Then, the replacing process is terminated. Thereafter, the first printer 100A can perform printing in response to print instructions. It is noted, however, the update of the print history PH on the server 500 (FIG. 3: S135) is not performed. Furthermore, the user can refer to the cause displayed in S440 and redo the replacing process.

As described above, in the present embodiment, the device management system 1000 (FIG. 1) has the server 500 and the terminal device 200. The storage 515 (in this case, the non-volatile storage 530) of the server 500 stores the registered device table 532 (FIG. 2B). In the registered device table (registered device table) 532, information SA, SN, TK, and PH, including the serial number SN, are registered. The serial number SN is an example of device identification information that identifies the printer 100. The information SA, SN, TK, and PH are examples of management information used to manage the printer 100, as described with reference to FIG. 3-FIG. 7.

The terminal device 200 performs the following processes. In S250 (FIG. 4), the processor 210 determines whether the authentication for login is successful or not. When the authentication is successful (S250: YES), the processor 210 receives the replacement instruction from the user in S260. The replacement instruction is an instruction to replace the serial number SN that has been stored in the server 500. The condition that the authentication is successful is an example of an acceptance condition for accepting the replacement instruction.

In S280 and S300, the processor 210 obtains the first serial number SN1, which is the serial number SN before replacement, in response to the replacement instruction. In S320 and S330, the processor 210 obtains the second serial number SN2, which is the serial number SN after replacement, in response to the replacement instruction.

In S280 and S300, the processor 210 obtains the updated print history PHb from the first printer 100A identified by the first serial number SN1 in response to the replacement instruction, without going through the server 500. The updated print history PHb is an example of history information that represents the usage history of the first printer 100A.

In S340 (FIG. 5), the processor 210 transmits the replacement request to the server 500. This replacement request is a request to replace the first serial number SN1 already stored in the server 500 with the second serial number SN2. This replacement request contains the first serial number SN1, the second serial number SN2, and the updated print history PHb.

The storage 515 (in this case, the non-volatile storage 530) of the server 500 (FIG. 1) stores data representing the registered device table 532. In S350 of FIG. 5, the processor 510 of the server 500 determines whether the allowance condition is satisfied. In the embodiment shown in FIG. 5, S350 is performed in a state where the registered device table 532 (FIG. 5) stores the first management information MI1. The first management information MI1 shows the relationship between the first serial number SN1 and the first service identifier SA1.

The allowance condition in S350 is the condition for allowing the replacement of the first serial number SN1 of the former printer with the second serial number SN2 of the new printer. In a first case where the allowance condition is satisfied (S350: YES), the processor 510 registers the second management information MI2 in the registered device table 532 and stores the data representing the registered device table 532 in the non-volatile storage 530 in S370. The second management information MI2 indicates the relationship among the first service identifier SA1, the updated print history PHb, and the second serial number SN2. The first service identifier SA1 is the service identifier SA that is associated with the first serial number SN1 by the first management information MI1 before the update.

As described above, the terminal device 200 obtains the updated print history PHb from the first printer 100A in S300 of FIG. 4, without going through the server 500. Thus, the server 500 can associate appropriate updated print history PHb with the second serial number SN2 in S370 of FIG. 5.

When the acceptance condition is satisfied (S250: YES), the terminal device 200 receives a replacement instruction from the user (S260). When the acceptance condition is not satisfied (S250: NO), the server 500 does not receive a replacement instruction. Thus, the possibility of receiving inappropriate replacement instructions is reduced.

When in the first case where the allowance condition is satisfied (S350: YES), the server 500 stores, the second management information MI2 indicating the relationship among the first service identifier SA1, the updated print history PHb, and the second serial number SN2 in the registered device table 532 (more specifically, in the non-volatile storage device 530) in S370. Thus, the possibility of storing inappropriate management information is reduced.

Furthermore, the second management information MI2 (FIG. 5) contains updated print history PHb, which shows the usage history of the first printer 100A. In this way, the usage history of the first printer 100A is properly succeeded by the service using the second printer 100B.

According to the present embodiment, in the first case where the allowance condition (S350: YES) is satisfied, the processor 510 of the server 500 transmits the second token TK2 to the terminal device 200 in S380. In S400, the processor 210 of the terminal device 200 transmits the second token TK2 obtained from the server 500 to the second printer 100B. As described with reference to FIG. 5, the second token TK2 is used in the print-process S100B, which uses the second printer 100B identified by the second serial number SN2. The second token TK2 is an example of usage information, which is information that should be used for printing services using the second printer 100B. As described above, in the first case where the allowance condition is satisfied, the printing service using the second printer 100B is possible.

Through the process of S380 and S400 in FIG. 5, the updated print history (print history) PHb is communicated to the second printer 100B in addition to the second token TK2. Therefore, the second printer 100B can properly succeed to the usage history of the first printer 100A.

In the present embodiment, the second token TK2 that should be used for the printing service using the second printer 100B (concretely, the print-process S100B (FIG. 5)) is different from the first token TK1 that should be used for the printing service using the first printer 100A (concretely, the print-process S1 (FIG. 3)). Therefore, the possibility of improper execution of printing services using the second printer 100B is reduced. For example, the possibility of improper use of the second printer 100B for printing services using the first token TK1 for the first printer 100A is reduced.

In the present embodiment, in S280 and S300 (FIG. 4), the processor 210 of the terminal device 200 obtains the first serial number SN1 from the first printer 100A, without going through the server 500. Therefore, the terminal device 200 can appropriately obtain the first serial number SN1. For example, even if the communication path between the first printer 100A and the server 500 has a defect, the terminal device 200 can still obtain the first serial number SN1.

In the present embodiment, in S320 and S330 (FIG. 4), the processor 210 of the terminal device 200 obtains the second serial number SN2 from the second printer 100B identified by the second serial number SN2, without going through the server 500. Therefore, terminal device 200 can appropriately obtain the second serial number SN2. For example, even if the communication path between the second printer 100B and the server 500 has a defect, the terminal device 200 can still obtain the second serial number SN2.

In the present embodiment, the device management system 1000 (FIG. 1) further includes a first printer 100A. The first printer 100A has the print engine 160. The updated print history PHb contains the history of printing by the print engine 160 (in this case, the cumulative number of sheets printed). In S290 and S300 (FIG. 4), the processor 110 of the first printer 100A transmits the updated print history PHb to the terminal device 200 after ceasing the printing function (S290) of the print engine 160 (S300). Therefore, the first printer 100A can send an updated print history PHb, which contains the latest history of printing, to the terminal device 200.

In the present embodiment, in S280 (FIG. 4), the processor 210 of the terminal device 200 transmits an information request, which is a request for information including the print history PH, to the first printer 100A. The processor 110 of the first printer 100A ceases the printing function (S290) in response to the information request from the terminal device 200. Therefore, the first printer 100A can appropriately transmit the updated print history PHb, which contains the latest history of printing, to the terminal device 200.

In the present embodiment, the processor 510 of the server 500 skips the update (S370) of the registered device table 532 in the second case (S350: NO) where the allowance condition is not satisfied. That is, the processor 510 cancels storing the second management information MI2. The processor 110 of the first printer 100A releases the cessation of the printing function (S460) when the start request (FIG. 6: S450) is received. This start request is an example of a notification due to an allowance condition not being satisfied. According to this configuration, the first printer 100A can perform printing in a second case where the allowance condition is not satisfied. Therefore, the possibility that both the printing function of the first printer 100A and the printing function of the second printer 100B are not available is reduced.

In the present embodiment, the processor 510 of the server 500 performs the user authentication in S230 of FIG. 4. The processor 210 of the terminal device 200 transmits the user authentication information associated with the user to the server 500 in S220, and obtains the results of the user authentication from the server 500 in S240. As described with reference to the process in S250, the acceptance condition for receiving the replacement instruction from the user contains a successful result of the user authentication (S250: YES). According to this configuration, the terminal device 200 can proceed with the replacing process based on appropriate user instructions.

B. Modified Embodiment

Figure 7:
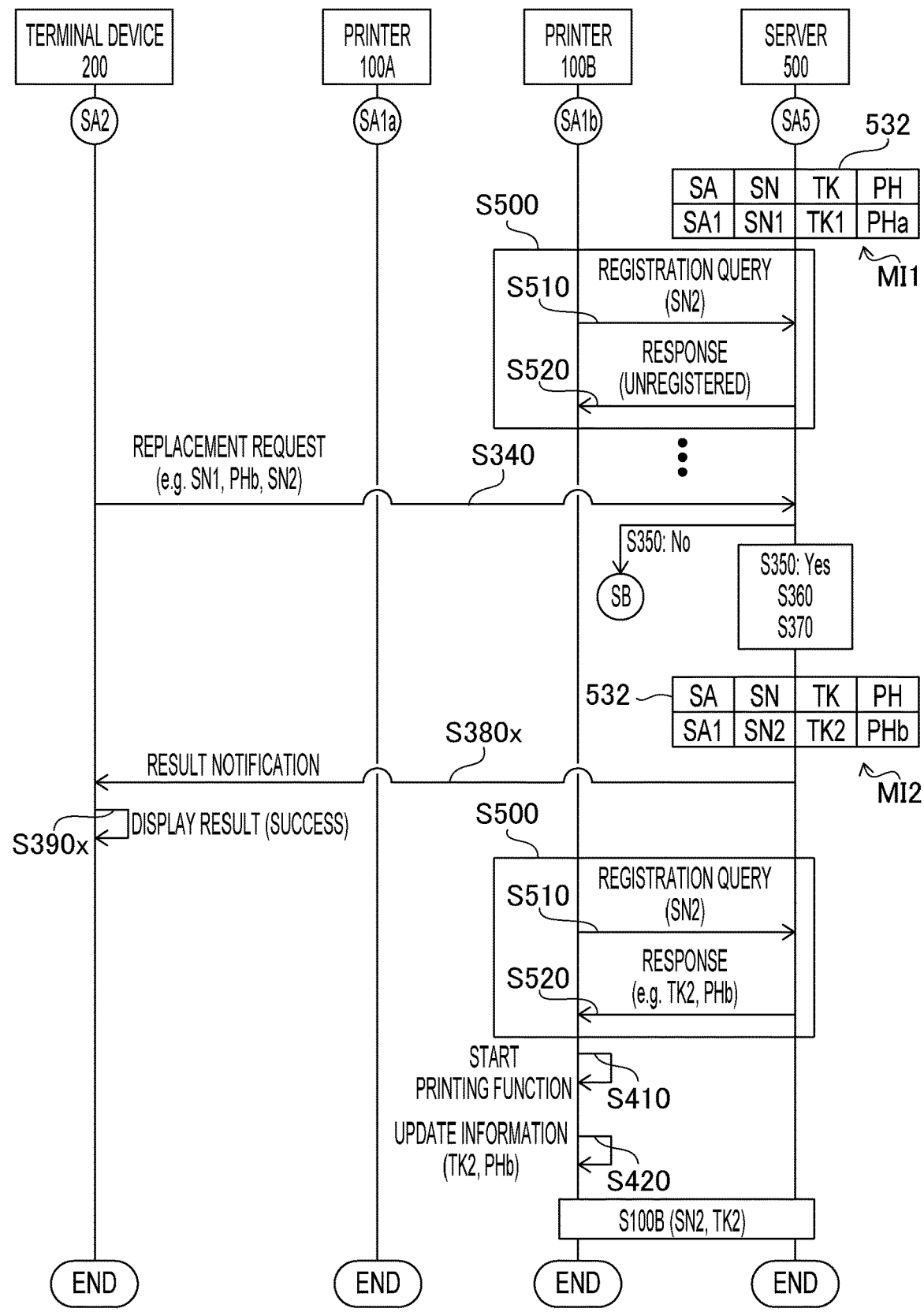
FIG. 7 is a sequence chart showing another example of the replacing process.

FIG. 7 shows a sequence chart illustrating a replacing process according to a modified embodiment. FIG. 7 shows a process that follows FIG. 4 instead of the process shown in FIG. 5. The difference from the replacement process in FIG. 4-FIG. 6 is that the server 500 transmits the information TK2 and PHb to the second printer 100B without going through the terminal device 200. The configuration of the system in which the replacing process proceeds is the same as the configuration of the device management system 1000 in FIG. 1.

In an upper part of FIG. 7, the registered device table 532 at the stage where the process has moved to FIG. 7 is shown. The registered device table 532 stores the first management information MI1. The first management information MI1 shows the relationship among the information SA1, SN1, TK1, and PHa of the former printer (in this case, the first printer 100A), as explained with reference to FIG. 5. The print history PH of the first management information MI1 is the unupdated print history PHa.

In response to the information request in S320 (FIG. 4), the processor 110 of the second printer 100B transmits a registration query to the server 500 (FIG. 7: S510). This query contains data representing the second serial number SN2 of the second printer 100B.

In S520, the processor 510 of the server 500 determines whether the serial number SN obtained in S510 (in this case, the second serial number SN2) has been registered in the registered device table 532. The processor 510 transmits a response indicating the determination result (i.e., registered or unregistered) to the second printer 100B. The processor 110 of the second printer 100B periodically transmits a registration query to the server 500 until the processor 110 receives a response indicating that the printer has been registered. Hereafter, the entire process of S510 and S520 is referred to as a registration confirmation process S500. The registration confirmation process S500 is repeated until the second serial number SN2 is registered in the registered device table 532.

In S320 of FIG. 4, the processor 210 of the terminal device 200 may transmit an information request directly to the NFC tag 175 of the second printer 100B through the NFC IF 270 operating in the reader/writer mode. In such a case, it is preferable that the processor 210 of the terminal device 200 transmits a start request to start transmitting the registration query to the second printer 100B through the NFC IFs 170 and 270 operating in the peer-to-peer mode in S320, so that the processor 110 of the second printer 100B can start transmitting the registration query (FIG. 7: S510).

After performing the process in FIG. 4, processes S340, S350, S360, and S370 of FIG. 7 are performed. The processes S340, S350, S360, and S370 are the same as the processes S340, S350, S360, and S370 in FIG. 5, respectively (where, in S350, the allowance condition is assumed to be satisfied). FIG. 7 shows the registered device table 532 updated in S370. The registered device table 532 stores the second management information MI2 (concretely, the relationship among the information SA1, SN2, TK2, and PHb) associated with the second printer 100B.

In S380x, the processor 510 of the server 500 transmits a result notification to the terminal device 200 indicating the result of the update (in this case, success). Unlike the result notification of S380 in FIG. 5, the data indicating the information TK2 and PHb that has been updated in S370 is omitted in the result notification of S380x.

In S390x, the processor 210 of the terminal device 200 displays the update results on the display 240 in response to the result notification. Then, the processing of the terminal device 200 is terminated.

As described above, the processor 210 of the second printer 100B repeats transmitting the registration query (S510) until the processor 210 receives a response indicating that the printer has been registered. After updating the registered device table 532 in S370, the processor 510 of the server 500 transmits a response indicating that registration has been completed to the second printer 100B in S520 in response to a registration query (S510). This response contains data representing the token TK and the print history PH that has been updated in S370 (in this case, the second token TK2 and the updated print history PHb).

The following processes of S410 and S420 are the same as the processes S410 and S420 in FIG. 5, respectively. In S410, the processor 110 of the second printer 100B starts the printing function in response to the response indicating that registration has been completed. In S420, the processor 110 updates the information TK and PH to the information TK2 and PHb obtained in S520. Then, the replacing process is terminated. Thereafter, when the second printer 100B receives a print instruction, the second printer 100B and the server 500 execute the print-process S100B. This print-process S100B is the same as the print-process S100B in FIG. 5.

When the determination result of S350 (FIG. 7) is NO, the process of FIG. 6 is performed as in the above-described embodiment.

As described above, in the present embodiment, in the first case (S350 of FIG. 7: YES) where the allowance condition is satisfied, the processor 510 of the server 500 transmits the second token TK2 to the second printer 100B (S520) without going through the terminal device 200. The second token TK2 is used in the print-process S100B which uses the second printer 100B identified by the second serial number SN2. The second token TK2 is an example of usage information, which is information to be used for printing services using the second printer 100B. As described above, in the first case where the allowance condition is satisfied, the printing service using the second printer 100B is possible.

In the present embodiment, the server 500 transmits the updated print history PHb in addition to the second token TK2 to the second printer 100B. Therefore, the second printer 100B can appropriately succeed to the usage history of the first printer 100A.

The replacing process in the present embodiment is the same as the replacing process in FIG. 4-FIG. 6, except that S380 in FIG. 5 has been replaced with S380x in FIGS. 7, S510 and S520 in FIG. 7 have been added, and S400 in FIG. 5 has been omitted. Therefore, as explained below, the present embodiment of the replacing process provides various advantages identical to those provided by the replacing process of the above-described embodiment.

The process in FIG. 4 is common to the present embodiment (i.e., the modified embodiment) and the above-described embodiment. Therefore, the present embodiment can provide the various advantages as described above, which are derived from the process in FIG. 4. For example, the terminal device 200 obtains the updated print history PHb from the first printer 100A without going through the server 500 in S300 of FIG. 4. Therefore, the server 500 can associate the appropriate updated print history PHb with the second serial number SN2 in S370 of FIG. 7.

The second token TK2 is different from the first token TK1. Therefore, the possibility of improper performance of printing services using the second printer 100B is reduced.

In the second case where the allowance condition is not satisfied (S350: NO), the server 500 skips the update (S370) of the registered device table 532. That is, the processor 510 cancels storing the second management information MI2. Then, the process proceeds to FIG. 6. When receiving the start request (FIG. 6: S450), the first printer 100A releases the cessation of the printing function (S460). Therefore, in the second case where the allowance condition is not satisfied, the first printer 100A can perform printing.

C. Modifications

While the present disclosures have been made in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the present disclosures, and not limiting aspects of the present disclosures. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in accordance with the present disclosures are provided below.

(1) In the above-described embodiment shown in FIG. 1, the first device information DI1 is stored in the NFC tag 175. Therefore, in S280 and S300 of FIG. 4, the terminal device 200 can obtain the first device information DI1 from the NFC tag 175 even if the first printer 100A cannot operate due to a failure. As described above, each of the above embodiment and the modified embodiment can proceed with the replacing process in the event of various failures of the first printer 100A. It is noted that the NFC tag 175 may be omitted from the printer 100. Further, the device information DI1 and DI2 may be stored in the non-volatile storage 130. Even in such a case, the processors 110 of the printers 100A and 100B may transmit the device information DI1 and DI2 to the terminal device 200 through the NFC IF 170.

(2) Regarding an interface connecting the printer 100 and the terminal device 200, any wireless interface enabling the short-distance communication (e.g., Bluetooth (registered trademark of BLUETOOTH SIG. INC.) interface) may be employed instead of the NFC IFs 170 and 270. The terminal device 200 may transmit requests to the printer 100, and receive device information DI1 and DI2 from the printer 100 through the wireless interface performing the short-distance communication.

(3) A method by which the terminal device 200 obtains the serial number SN from the printer 100 is not necessarily limited to the method using the wireless interface, but any method can be employed. For example, the printer 100 may display a QR code (registered trademark of DENSO WAVE INCORPORATED) representing the serial number SN on the display 140, and the terminal device 200 may be provided with a digital camera. The terminal device 200 may capture the QR code with the digital camera, and obtains the serial number SN by analyzing the captured image of the QR code. Alternatively, the terminal device 200 may obtain the serial number SN from the printer 100 through a network. For example, the information request (S280, S320) and transmission of the device information (S300, S330) may be performed through the network NT.

As shown in FIGS. 5 and 7, when the replacing process is performed, the serial number SN of the former printer (e.g., the first serial number SN1 of the first printer 100A) has been registered in the registered device table 532. Therefore, the terminal device 200 may obtain the serial number SN of the former printer from the server 500. For example, in S280 of FIG. 4, the terminal device 200 may transmit the information request to the server 500. In the information request, the user authentication information transmitted in S220 may be contained. The server 500 may notify the terminal device 200 of the serial number SN having been registered in the registered device table 532 (e.g., the serial number SN associated with the user authentication information).

When the printing service provided ships the substitute printer, the serial number SN of the substitute printer may be registered with the server 500 in association with the service identifier SA. In this case, the terminal device 200 may obtain the serial number SN of the new printer from the server 500. For example, in S320 of FIG. 4, the terminal device 200 may transmit the information request to the server 500. This information request may contain the user authentication information transmitted in S200. The server 500 may transmit the registered serial number SN of the new printer (e.g., the serial number SN associated with the user authentication information) to the terminal device 200.

As methods of obtaining other information related to the printer 100 (e.g., the print history PH), various methods may be employed as the method of obtaining the serial number SN.

(4) The acceptance condition for receiving the replacement instruction is not necessarily be limited to the condition containing the success of the user authentication as describe referring to S250 of FIG. 4, but could be various conditions. For example, the acceptance condition may be that an appropriate service identifier SA is input to the terminal device 200. Alternatively, the acceptance condition may be that a password, that has been determined in advance, is input to the terminal device 200. It is noted that the acceptance condition may be omitted. That is, divergence of the process depending on whether the acceptance condition is satisfied or not may be omitted. In other words, the terminal device 200 may be configured to receive the replacement instruction without determining whether the acceptance condition is satisfied or not. For example, the management application may be installed only in the terminal devices 200 of the users who are allowed to perform the replacing process. In such a case, the terminal devices may be configured to receive the replacement instruction without rejection.

(5) The notification to be transmitted to the first printer 100A based on the allowance condition (S350 of FIG. 5, FIG. 7) not being satisfied may be any notification instead of the start request (FIG. 6) from the terminal device 200. For example, the server 500 may notify the first printer 200A of the fact that the allowance condition is not satisfied. In either case, the first printer 100A may release cessation of the printing function (FIG. 6: S460) when the first printer 100A receives the notification due to the allowance condition not being satisfied. It is noted that S460 may be omitted.

(6) The allowance condition for allowing the replacement of the serial number SN of the former printer with the serial number SN of the new printer is not necessarily limited to the condition with reference to S350 of FIG. 5, but may be various conditions. For example, when the printing service provider ships the substitute printer, a relationship between the serial number SN of the former printer and the serial number SN of the new printer may be registered with the server 500. In such a case, the allowance condition is that a combination of the serial numbers SN of the former and new printers represented by the replacement request (S340 of FIG. 5 and FIG. 7) has been registered with the server 500.

It is noted that the allowance condition may be omitted. That is, the divergence of the process depending on the allowance condition may be omitted. In other words, the server 500 may be configured to receive the replacement request without determining whether the allowance condition is satisfied or not. For example, when the printing service provider ships the substitute printer, a relationship between the serial number SN of the former printer and the serial number SN of the new printer may be registered with the server 500. In such a case, the server 500 may receive the replacement request without rejecting the same, and replace the serial number SN of the former printer with the serial number SN of the new printer. Further, both the divergence of the process depending on the acceptance condition and the divergence of the process depending on the allowance condition may be omitted.

(7) The replacing process is not necessarily limited to the processes in the above-described embodiment, modified embodiment and modifications, but may be a variety of processes. For example, S280-S300 of FIG. 4 may be executed after S330. Further, in the embodiment shown in FIGS. 7, S510 and S530 may be omitted. Further, the server 500 may be configured to transmit the second token TK2 to the second printer 100B in response to the registered device table 532 being updated in S370. Further, in response to the registered device table 532 is updated in S370 (FIG. 5 and FIG. 7) after S290 (FIG. 4), the first printer 100A may start the printing function. For example, the server 500 may transmit the start request of the printing function to the first printer 100A after S370. Further, the terminal device 200 may transmit the start request of the printing function to the first printer 100A after S380 or S380x (FIG. 5, FIG. 7). Further, S290 of FIG. 4 (i.e., cessation of the printing function) may be omitted.

(8) The trigger of the replacing process is not necessarily limited to the failure of the first printer 100A, but may be any trigger. For example, the replacing process may be performed when a printer of a former model is replaced with a printer of a new model.

(9) The second token TK2 for the second printer 100B (FIG. 5: S360) may be the same as the first token TK1 for the first printer 100A. As such, the token TK can be information having been determined in advance.

(10) The target device for the replacing process is not necessarily limited to the printer 100, but may be any device configured to perform a particular process, such as a scanner, a multifunction peripheral, a sewing machine, a cutting machine, or a machine tool. Further, the service using the target device may be any service. For example, the service may be a storage service providing a cloud storage. In such a case, the target device may store various data in the cloud storage. The server 500 may register the relationship between the service identifier SA associated with the contract of the storage service and the serial number SN of the target device in the registered device table 532 (FIG. 2B).

(11) Usage information used for the printing service is not necessarily limited to the token TK that is used for the communication between the target device (e.g., the printer 100) and the server 500, but may be various information. For example, the service identifier SA may be used instead of the token TK. Further, the target device may request for a password to execute a particular process performed by the target device (e.g., the printing process performed by the printer 100). The password is an example of the usage information. In the replacing process, the server 500 may transmit the password for the new target device to the terminal device of the new target device, instead of the second token TK2. The password may be newly determined by the server 500. Alternatively, the password may have been determined in advance. It is noted that the transmission of the usage information by the server 500 may be omitted.

(12) The management identification information may be various identification information associated with the contract of the service, instead of the service identifier SA assigned to the contract of the service. For example, when one or more pieces of user identification information (e.g., the user account name) is associated with the contract of the service, the user identification information may be used as the management identification information. Further, to the management application configured to run on the terminal device 200, the application identification information may be assigned. Further, when the one or more pieces of application identification information is assigned to the contract of the service, the application identification information may be used as the management identification information.

(13) The history information representing the usage history of the target device may not be limited to information representing the cumulative number of sheets printed, but any history information related to particular processes by the target device. For example, the history information may represent total amount of data stored in the clout storage.

(14) The management information stored in the storage 515 of the server 500 (e.g., the non-volatile storage 530) is not necessarily limited to the relationship among the information SA, SN, TK, and PH (FIG. 2B), but information indicating a relationship among various (i.e., two or more pieces of) information including the management identification information (e.g., the service identifier SA), the device identification information (e.g., the serial number SN) and the history information (e.g., the print history PH). For example, the management information may contain a model name of the target device. Further, the token TK may be omitted.

(15) Multiple devices (e.g., computers) that can communicate with each other via a network may share some of the functions of data processing by the server 500 and provide, as a whole, the data processing function. In such a case, a system including such devices serves as a server.

In each of the above examples, part of the configuration realized by hardware may be replaced with software, or conversely, part or all of the configuration realized by software may be replaced with hardware. For example, the function of updating realized in S370 of FIG. 5 may be realized by a dedicated hardware circuit.

The techniques disclosed herein can be realized in various forms, such as a method and apparatus for transmitting a replacement request, a method and apparatus for storing management information in a storage device, a processing method using a terminal device and a server, a system having a terminal device and a server, and the like. The method or apparatus may be embodied in a computer program for realizing the functions of the method or apparatus, a recording medium (e.g., a non-transitory recording medium) in which the computer program is recorded, and the like.

When some or all of the functions according to the present disclosures are realized by a computer program, the program can be provided in a form stored in a computer-readable recording medium (e.g., a non-transitory computer-readable recording medium). The program can be used as stored on the same recording medium when provided or a recording medium (e.g., a computer-readable recording medium) different from one when the program was provided. It is noted that the computer-readable recording media is not limited to portable recording media such as memory cards or CD-ROMs, but can also include internal storage devices in the computer such as various ROMs, and external storage devices connected to the computer such as hard disk drives.

The embodiment, the modified embodiment and the modifications thereof described above are intended to facilitate understanding aspects of the present disclosures and are not intended to limit the aspects of the present disclosures. The configurations described above may be modified and/or improved without departing from the aspects of the present disclosures, and the aspects of the present disclosures include equivalents of the disclosed configurations.

What is claimed is:

1. A device management system, comprising:
a server having a storage configured to store management information that includes device identification information for identifying devices; and a terminal device, the terminal device comprising a controller having hardware and configured to perform:

receiving a replacement instruction that instructs replacement of the device identification information having been stored in the server when an acceptance condition is satisfied;

in response to receipt of the replacement instruction, first obtaining first device identification information that is the identification information before the replacement;

in response to receipt of the replacement instruction, second obtaining second device identification information that is the identification information after the replacement;

in response to receipt of the replacement instruction, obtaining first history information representing usage history of the first device from the first device identified by the first device identification information without going through the server; and transmitting, to the server, a replacement request that is a request to replace the first device identification information having been stored in the server with the second device identification information, the replacement request containing the first device identification information, the second identification information and the first history information that has been obtained without going through the server, wherein the storage of the server stores first management information representing a relationship between the first device identification information and first management identification information, and wherein the server is configured to store, in the storage of the server, second management information in a first case where an allowance condition for allowing replacement of the first device identification information with the second identification information is satisfied, the second management information represents a relationship among the first management identification information associated with the first device identification information by the first management information, the first history information and the second device identification information.

2. The device management system according to claim 1, wherein the server is configured to perform first storing usage information that is information to be used for a service using a second device identified by the second device identification information in the first case where the allowance condition is satisfied, and wherein the controller of the terminal device is configured to perform second transmitting the usage information obtained from the server to the second device.

3. The device management system according to claim 1, wherein the server is configured to perform first transmitting usage information that is information to be used for a service using a second device identified by the second device identification information in the first case where the allowance condition is satisfied to the second device without going through the terminal device.

4. The device management system according to claim 2, wherein the usage information to be used for the service using the second device is different from usage information to be used for a service using the first device.

5. The device management system according to claim 1, wherein, in the first obtaining, the controller of the terminal device obtains the first device identification information from the first device without going through the server.

6. The device management system according to claim 1, wherein, in the second obtaining, the controller of the terminal device obtains the second device identification information from a second device identified by the second device identification information without going through the server.

7. The device management system according to claim 1, further comprising a first device having a print engine, wherein the first history information contains print history of the print engine, and wherein the first device is configured to perform transmitting the first history information to the terminal device after a printing function of the print engine is ceased.

8. The device management system according to claim 7, wherein the controller of the terminal device is configured to perform transmitting information request that is a request for information containing the first history information to the first device, and wherein the first device is configured to cease the printing function in response to the information request transmitted from the controller of the terminal device.

9. The device management system according to claim 7, wherein the server is configured to cancel storing the second management information in a second case where the allowance condition is not satisfied, and wherein the first device is configured to release cessation of the printing function when a notification that has been issued when the allowance condition is not satisfied is received.

10. The device management system according to claim 1, wherein the server is configured to perform a user authentication, wherein the controller of the terminal device is configured to obtain a result of the user authentication by transmitting the information related to the user to the server, and wherein the acceptance condition includes a condition where the result of the user authentication is successful.

11. A device management system, comprising:

a server having a storage configured to store management information that includes device identification information for identifying devices; and a terminal device, the terminal device comprising a user interface and a controller having hardware and configured to perform:

receiving, through the user interface, a replacement instruction to replace the device identification information having been stored in the server;

in response to the replacement instruction, first obtaining first device identification information that is device identification information before replacing the device identification information;

in response to the replacement instruction, second obtaining second device identification information that is device identification information after replacing the device identification information;

in response to the replacement instruction, obtaining first history information representing usage history of the first device from the first device identified by the first device identification information without going through the server; and transmitting, to the server, a replacement request to replace the first device identification information having been stored in the server with the second device identification information, the replacement request including the first device identification information, the second device identification information and the first history information that has been obtained without going through the server, wherein the storage of the server stores first management information indicating a relationship between the first device identification information and first management identification information, and wherein the server is configured to store the first management identification information associated with the first device identification information by the first management information and second management information indicating a relationship between the first history information and the second device identification information in the storage.

12. A non-transitory computer-readable recording medium for a computer configured to communicate with a server having a storage storing management information containing device identification information for identifying devices, the recording medium contains computer-executable instructions which cause, when executed by the computer, the computer to perform:

receiving, through a user interface, a replacement instruction to replace the device identification information having been stored in the server;

in response to the replacement instruction, first obtaining first device identification information that is device identification information before replacing the device identification information;

in response to the replacement instruction, second obtaining second device identification information that is device identification information after replacing the device identification information;

in response to the replacement instruction, obtaining first history information representing usage history of the first device from the first device identified by the first device identification information without going through the server; and transmitting, to the server, a replacement request to replace the first device identification information having been stored in the server with the second device identification information, the replacement request including the first device identification information, the second device identification information and the first history information that has been obtained without going through the server, wherein the storage of the server stores first management information indicating a relationship between the first device identification information and first management identification information, and wherein the replacement request is a request requiring the storage to store the first management identification information associated with the first device identification information by the first management information and second management information indicating a relationship between the first history information and the second device identification information in the storage.

* * * * *